Patented Oct. 13, 1953

2,655,438

UNITED STATES PATENT OFFICE 2,655,438

SALT CRYSTALLIZATION PROCESS

William Keith Gilkey, Cuyahoga Falls, Ohio, and Albert Cornwell Shuman, Mountain Lakes, N. J., assignors, by mesne assignments, to Diamond Crystal Salt Co., St. Clair, Mich., a corporation of Michigan No Drawing. Application December 6, 1950, Serial No. 199,563

2 Claims. (Cl. 23—303)

This invention relates to the formation of salt crystals on the surface of a salt brine, and more particularly to an improvement in the processes for producing salt crystals of the so-called hopper type.

As described in Chemical and Metallurgical Eng. 47, 530–534 (1940), there are three commercial processes generally used today for refining salt by evaporation. These processes include the vacuum pan process where a salt brine is boiled at less than atmospheric pressure, the surface evaporation or grainer process and the flash evaporation or Alberger process. The grain or structure of the salt crystal produced according to each of these three processes is determined by the method of evaporation. In the vacuum pan process, the crystallization of the salt is mostly below the surface of the brine with the result that a cubical crystal is formed. In the grainer and Alberger processes, the crystallization of the salt is mostly on the surface of the brine where evaporation takes place with the result that a crystal of the so-called hopper type is formed. It is believed that the growth of such hopper crystals on the brine surface is the result of additional growths of salt becoming attached to an initial or original cube type crystal which acts as a nucleus. When the nucleus grows, it immerses slightly below the surface of the brine so that additional growth takes place on the edges of the nucleus which are nearest the surface of the brine. The nucleus thus tends to take a rectangular form along its edges nearest the brine surface and as such growth causes the crystal to again immerse slightly, further additional growth takes place along the edges of the previously formed rectangular growth. The crystal continues to grow in this manner and gradually assumes the shape of a hopper whose sides are formed of multiple rectangular growths. Such crystals are supported near the surface by the surface tension of the brine and will continue to grow in the form of a hopper until their increased weight causes them to sink below the brine surface or until they are otherwise removed.

In both the grainer and Alberger processes it has been noted that surface evaporation of the brine may fail to produce the desired degree or rate of hopper crystal formation and/or sometimes results in a scum type of salt formation. This scum formation is a thin sheet of salt which extends across the brine surface and, when present, retards the formation of the hopper crystals. The sheet of scum is generally a few ten thousandths of an inch in thickness and is sometimes flat but is more often very uneven with ridges and valleys about ¼" deep. With the formation of such scum during the surface evaporation of the brine, the formation of the desired hopper crystals is retarded and often entirely prohibited, and heretofore such scum has been physically removed in order that the desired degree or rate of hopper crystallization could be maintained.

An object of the present invention is to provide an improved process for producing hopper type salt crystals.

Another object of the invention is to provide an improved process for producing hopper type crystals free from scum formation.

A further object is to provide an improved method of producing hopper type crystals by the grainer and/or Alberger processes.

A still further object is to accomplish the foregoing in a simple, economical manner.

Still further objects of the invention will be apparent from the following description.

It has now been found that the formation of hopper crystals is greatly aided by the addition of a surface active agent which promotes the formation of the hopper crystals during surface evaporation of the brine.

It has also been found that scum formation is due to the presence of scum forming impurities and that hopper crystallization can be obtained free from scum formation by removing or effectively removing such scum forming impurities prior to surface evaporation of the brine. In this respect it has been found that such impurities can be removed by filtering the brine through an absorbent, such as charcoal, fuller's earth, diatomaceous earth, precipitated magnesium silicates and the like, or the impurities can be effectively removed by adjusting the pH of the brine to an acid value.

In investigating the conditions necessary to hopper crystallization it was noted that samples of brine from different sources would often produce different types of surface crystallization under identical conditions of surface evaporation, and that samples of brine from the same source would at different times produce different degrees of hopper crystallization.

It was then discovered that the addition of certain materials to a brine which exhibited an insufficient rate of hopper crystallization had the effect of increasing the rate of hopper crystal formation. Such materials were generally of the surface active type. Of these surface active materials, some were found to promote a greater rate of hopper crystallization than others. In this respect, and by way of example, the following is a list of some of the surface active materials or agents which were found to promote the formation of hopper crystallization to a satisfactory degree:

Acetic, n-butyric and cerotic acids;
Citronellol, rhodinol and castor oil;
Gasolene, kerosene and alcoholic extracts of kerosene;
Ceryl alcohol and various mixtures of esters of aliphatic alcohols;
Sodium salts of sulfonated alcohols, such as, $C_4H_9CH(C_2H_5)CH_3SO_4Na$, $C_4H_9CH(C_2H_5)$

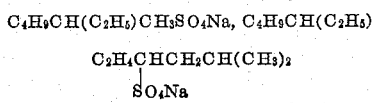

and

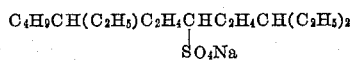

and

Cincole, oil of eucalyptus, pinene, oil of sandalwood, terpineol, pine oil, n-propyl n-butyrate, ethyl oleate, methyl n-hexyl pentone, pyroligneous acid and polyoxyethylene sorbitan monolaurate.

In order to determine the effectiveness of a given surface active agent in promoting hopper crystal formation and also the optimum concentration of such agent the following test may be used with highly accurate results.

Samples of pure brine saturated at room temperature are placed in glass beakers 7" deep containing about 2,000 cc. of brine. The liquid surface of the samples has an area of 0.133 sq. ft. The samples are heated by 300 watt electric immersion heaters placed in the form of a coil around the inside circumference of the beaker about 2½" from the bottom thereof. The beakers are thermally insulated on the sides and bottom and the rate of evaporation is regulated by the power input to the heaters which is kept at 126 watts or 7.16 B. t. u. per minute which gives a rate of evaporation of about 2.5 lbs. of water per square foot of surface per hour. This is a rate of evaporation comparable to that employed industrially in the production of hopper crystals. The samples of brine are subjected to a preliminary evaporation period until the level of the brine in the beaker has dropped $\frac{1}{32}$ of an inch, this drop in level being the calculated amount necessary to make the sample saturated at 210° F. starting with a 6½" depth of saturated brine at 80° F., due allowance being made for the rise in level due to increasing temperature. Some scum type salt crystallization usually forms during this preliminary concentration period due to the presence of scum forming impurities on the surface of the apparatus and such scum is either dissolved by thoroughly stirring the sample or physically removed.

The material to be tested is then added, a very small amount at a time, to the sample of evaporating brine. About one minute is allowed after each addition of material for hopper crystallization to take place and, if no substantial increase in such crystallization occurs, more material is added. Additions of the material are continued until either the entire surface of the brine is covered with crystals or until 500 parts per million have been added. In the latter event the agent is judged to be of insufficient effectiveness.

The material to be added is usually added in the form of a dilute solution of either ethyl alcohol, chloroform or distilled water in order to more accurately control the amount of the material added, the organic solvents having been tested and found to have substantially no effect upon either the hopper crystal or scum formation.

Considerable care is taken to avoid contamination of the samples with possible scum forming impurities, and all of the apparatus which comes in contact with the samples is cleaned in a hot sulfuric cleaning solution and rinsed off with distilled water. Care is also taken with the samples to prevent contamination by dust and other impurities which are carried in the air.

In view of the fact that surface evaporation of many samples of brine resulted in the formation of scum, such scum formation was investigated and it was found that the formation of a salt crust or scum could be controlled by acidifying the brine. This apparently has the effect of effectively removing the scum forming materials. For example, when a sample of brine which has an initial pH of about 7.4 and which will produce a salt crust or scum upon surface evaporation is acidified the tendency towards scum formation is reduced and hopper crystallization occurs. As the brine is further acidified the scum or crust disappears and good hopper crystal formation is obtained. However, when the pH of a similar brine sample is adjusted to an alkaline value, the tendency towards scum formation is increased and the degree of hopper formation is decreased.

In a similar manner, when surface active materials which when tested by the aforementioned test procedure were shown to cause scum formation in addition to promoting the rate of hopper formation, are added to the brine, the scum formation can be controlled and/or eliminated by adjusting the pH of the brine to the proper acid value. Such materials are, for example, certain fatty acids, such as n-caprylic, palmitic and cerotic. Similarly, when rhodinol, which was found to cause scum formation when excessive quantities thereof were added to the brine, was added to an acidified brine an excellent degree of hopper crystallization was obtained free from scum formation, such larger quantities of rhodinol promoting an even greater degree of hopper crystallization than could be obtained with lesser quantities thereof.

As aforementioned, it has also been found that hopper crystallization free from scum formation can be obtained by removing such scum forming impurities as by treating the brine with an adsorbent, such as, for example, charcoal, fuller's earth, diatomaceous earth, precipitated magnesium silicate and the like. Thus, in those cases where it is undesirable to use an acidified brine the scum forming impurities can be removed by first filtering the brine through an adsorbent and then adding one of the aforementioned surface active materials to promote hopper crystal formation free from scum formation.

As a result of the foregoing findings in respect to the use of a surface active agent to promote the growth of hopper crystals and as to the removal or effective removal of scum forming impurities, it is now possible to obtain the desired rate of hopper crystallization regardless of the initial characteristics of the surface crystallization of the brine. For example, where brine is found to produce an insufficient rate of hopper crystallization upon surface evaporation, one has only to add a predetermined quantity of a surface active material such as those aforementioned in order to promote the desired rate of growth of hopper crystals. Similarly, where the brine is found to produce a scum formation in addition to, or even to the exclusion of hopper crystallization, one has only to filter the brine through an adsorbent, e. g., charcoal, to remove the scum forming impurities or, as an alternative, the pH of the brine can be adjusted to the necessary acid value with the effect that the scum forming impurities are effectively removed. If, upon surface evaporation of a brine, so treated as to remove or effectively remove the scum forming impurities, it is noted that the rate of hopper crystallization is insufficient, a surface active agent or material can be added as desired in order to promote the growth of hopper crystallization. Further, where because of cost or otherwise, it is desired to use a surface active agent which in addition to promoting hopper formation also causes some scum formation, as heretofore explained, the scum forming effect of such surface active agent can be minimized by adjusting the pH of the brine to the proper acid value.

While the present invention has been described with respect to specific surface active materials, adsorbents and operating details, it is to be understood that the invention is not restricted thereto and that the scope of the present invention is to be determined solely by reference to the appended claims.

What is claimed is:

1. In the process for producing sodium chloride crystals of the hopper type by surface evaporation of a brine, the step comprising adding a predetermined quantity of polyoxyethylene sorbitan monolaurate to the brine prior to surface evaporation thereof.

2. In a process of producing sodium chloride crystals of the hopper type by surface evaporation of a brine, the step comprising adding to the brine prior to surface evaporation thereof a polyoxyethylene derivative of sorbitan partial ester of a fatty acid containing at least twelve carbon atoms.

WILLIAM KEITH GILKEY.
ALBERT CORNWELL SHUMAN.

References Cited in the file of this patent

UNITED STATES PATENTS

| Number | Name | Date |
|---|---|---|
| 210,541 | Konig | Dec. 3, 1878 |
| 903,357 | Clifton | Nov. 10, 1908 |
| 1,598,935 | Robison | Sept. 7, 1926 |
| 1,766,705 | Dehuel | June 24, 1930 |
| 2,044,942 | Heckert | June 23, 1936 |
| 2,113,248 | Berg | Apr 5, 1938 |
| 2,452,576 | Kjellgren | Nov. 2, 1948 |
| 2,595,238 | Frejacques | May 6, 1952 |
| 2,604,385 | Chambers | July 22, 1952 |

FOREIGN PATENTS

| Number | Country | Date |
|---|---|---|
| 617,137 | Great Britain | Feb. 1, 1949 |

OTHER REFERENCES

Mario—Proc. Intern. Cong. Pure and Applied Chem. (London) 11,237, 1947 (Abstracted in I. and E. Chem. vol. 43, No. 1, January 1951, page 60).

I. and E. Chem.—Crystallization—Grove, vol. 40, No. 1, January 1948, page 12.

I. and E. Chem.—Crystallization—Grove, vol. 41, No. 1, January 1949, page 23.